(12) United States Patent
Crose

(10) Patent No.: US 9,595,201 B2
(45) Date of Patent: Mar. 14, 2017

(54) WIRELESS MOBILE TRAINING DEVICE AND METHOD OF TRAINING A USER UTILIZING THE WIRELESS MOBILE TRAINING DEVICE

(71) Applicant: Ka-Ching!, LLC, Rochester Hills, MI (US)

(72) Inventor: William Warren Crose, Rochester Hills, MI (US)

(73) Assignee: Ka-Ching!, LLC, Rochester Hills, MI (US)

( * ) Notice: Subject to any disclaimer, the term of this patent is extended or adjusted under 35 U.S.C. 154(b) by 24 days.

(21) Appl. No.: 14/635,049

(22) Filed: Mar. 2, 2015

(65) Prior Publication Data

US 2015/0281817 A1    Oct. 1, 2015

Related U.S. Application Data

(60) Provisional application No. 61/970,409, filed on Mar. 26, 2014.

(51) Int. Cl.
*H04R 3/00* (2006.01)
*G09B 5/04* (2006.01)

(52) U.S. Cl.
CPC ..................... *G09B 5/04* (2013.01)

(58) Field of Classification Search
None
See application file for complete search history.

(56) References Cited

U.S. PATENT DOCUMENTS

| 7,828,697 | B1* | 11/2010 | Oberrieder | A63B 24/0062 482/1 |
|---|---|---|---|---|
| 2008/0132798 | A1* | 6/2008 | Hong | A61B 5/6815 600/508 |
| 2010/0331145 | A1* | 12/2010 | Lakovic | G04F 10/00 482/8 |
| 2011/0003665 | A1* | 1/2011 | Burton | G04F 10/00 482/9 |
| 2011/0165998 | A1* | 7/2011 | Lau | A63B 24/0062 482/8 |

* cited by examiner

*Primary Examiner* — Joseph Saunders, Jr.
*Assistant Examiner* — James Mooney
(74) *Attorney, Agent, or Firm* — Buckert Patent & Trademark Law Firm, PC; John F. Buckert

(57) ABSTRACT

A wireless mobile training device has a microprocessor, a first switch, a microphone, and a speaker. The microprocessor generates a first control signal to induce the speaker to emit a first audible instruction requesting a training program identifier. The microphone generates a first input signal corresponding to a received audible training program identifier. The microprocessor generates a second control signal to induce the speaker to emit a second audible instruction associated with a predetermined training program name, if the received audible training program identifier corresponds to the predetermined training program identifier. The microprocessor determines a first time interval for completing a first user task associated with the second audible instruction based on second and third input signals from either the first switch or the microphone.

5 Claims, 12 Drawing Sheets

TRAINING SYSTEM REPORT

DATE: 03/21/2014
STEP ANALYSIS REPORT FOR: BILL CROSE
PROGRAM NAME: TEQUILA SUNRISE

| STEP: | DESCRIPTION: | MEAN TIME: | ACTUAL TIME: | PREVIOUS TIME: | PRIOR 10 MEAN: | % OF MEAN: | REWARD: | RE-TRAINING NEEDED: |
|---|---|---|---|---|---|---|---|---|
| 1 | FILL HIGHBALL GLASS WITH ICE | 10 | 10 | 8 | 8 | .0 | Y | N |
| 2 | POUR 2 OZ. TEQUILA AND 4 OZ. ORANGE JUICE INTO GLASS | 120 | 180 | 185 | 190 | .5 | N | Y |
| 3 | SLOWLY POUR 1/2 OZ. OF GRENADINE AROUND SIDE OF GLASS SO INGREDIENTS NATURALLY MIX | 20 | 30 | 40 | 45 | .5 | N | Y |
| 4 | GARNISH WITH ORANGE SLICE AND CHERRY | 180 | 175 | 180 | 177 | -.03 | Y | N |

ACTIONS REQUIRED:

RETRAIN STEP 2 - POUR TOOK TOO LONG
RETRAIN STEP 3 - POUR TOOK TOO LONG
REWARD STEP 1 - CONSISTENTLY BEATS MEAN TIME
REWARD STEP 4 - CONSISTENTLY BEATS MEAN TIME

FIG. 12

WIRELESS MOBILE TRAINING DEVICE AND METHOD OF TRAINING A USER UTILIZING THE WIRELESS MOBILE TRAINING DEVICE

CROSS-REFERENCE TO RELATED APPLICATIONS

This application claims priority to U.S. Provisional Patent Application No. 61/970,409 filed on Mar. 26, 2014, the entire contents of which are hereby incorporated by reference herein.

BACKGROUND

The inventor herein has recognized a need for an improved wireless mobile training device and a method for training learners via the wireless mobile training device.

SUMMARY

A wireless mobile training device in accordance with an exemplary embodiment is provided. The wireless mobile training device includes a first switch, a microphone, and an electrical speaker operably coupled to the microprocessor. The wireless mobile training device further includes a housing adapted to hold the microprocessor, the first switch, the microphone, and the electrical speaker therein. The microprocessor is programmed to generate a first control signal to induce the electrical speaker to emit a first audible instruction requesting a training program identifier. The microphone is adapted to generate a first input signal corresponding to a received audible training program identifier. The first input signal is received by the microprocessor. The microprocessor is further programmed to generate a second control signal to induce the electrical speaker to emit a second audible instruction associated with a predetermined training program identifier, if the received audible training program identifier corresponds to the predetermined training program identifier. The microprocessor is further programmed to determine a first time interval for completing a first user task associated with the second audible instruction based on second and third input signals from either the first switch or the microphone. The microprocessor is further programmed to store a first time interval value corresponding to the first time interval in a memory device.

A method for training a user utilizing a wireless mobile training device in accordance with another exemplary embodiment is provided. The wireless mobile training device has a microprocessor, a first switch, a microphone, an electrical speaker, and a housing. The microprocessor is operably coupled to the first switch, the microphone, and the electrical speaker. The housing is adapted to hold the microprocessor, the first switch, the microphone, and the electrical speaker therein. The method includes generating a first control signal to induce the electrical speaker to emit a first audible instruction requesting a training program identifier utilizing the microprocessor. The method further includes generating a first input signal corresponding to a received audible training program identifier utilizing the microphone. The first input signal is received by the microprocessor. The method further includes generating a second control signal to induce the electrical speaker to emit a second audible instruction associated with the predetermined training program name, utilizing the microprocessor, if the received audible training program identifier corresponds to a predetermined training program identifier. The method further includes determining a first time interval for completing a first user task associated with the second audible instruction based on second and third input signals from either the first switch or the microphone, utilizing the microprocessor. The method further includes storing a first time interval value corresponding to the first time interval in a memory device utilizing the microprocessor.

BRIEF DESCRIPTION OF THE DRAWINGS

FIG. 12 is a training system report that is generated by the training system of FIG. 1.

DETAILED DESCRIPTION

Figure 1:
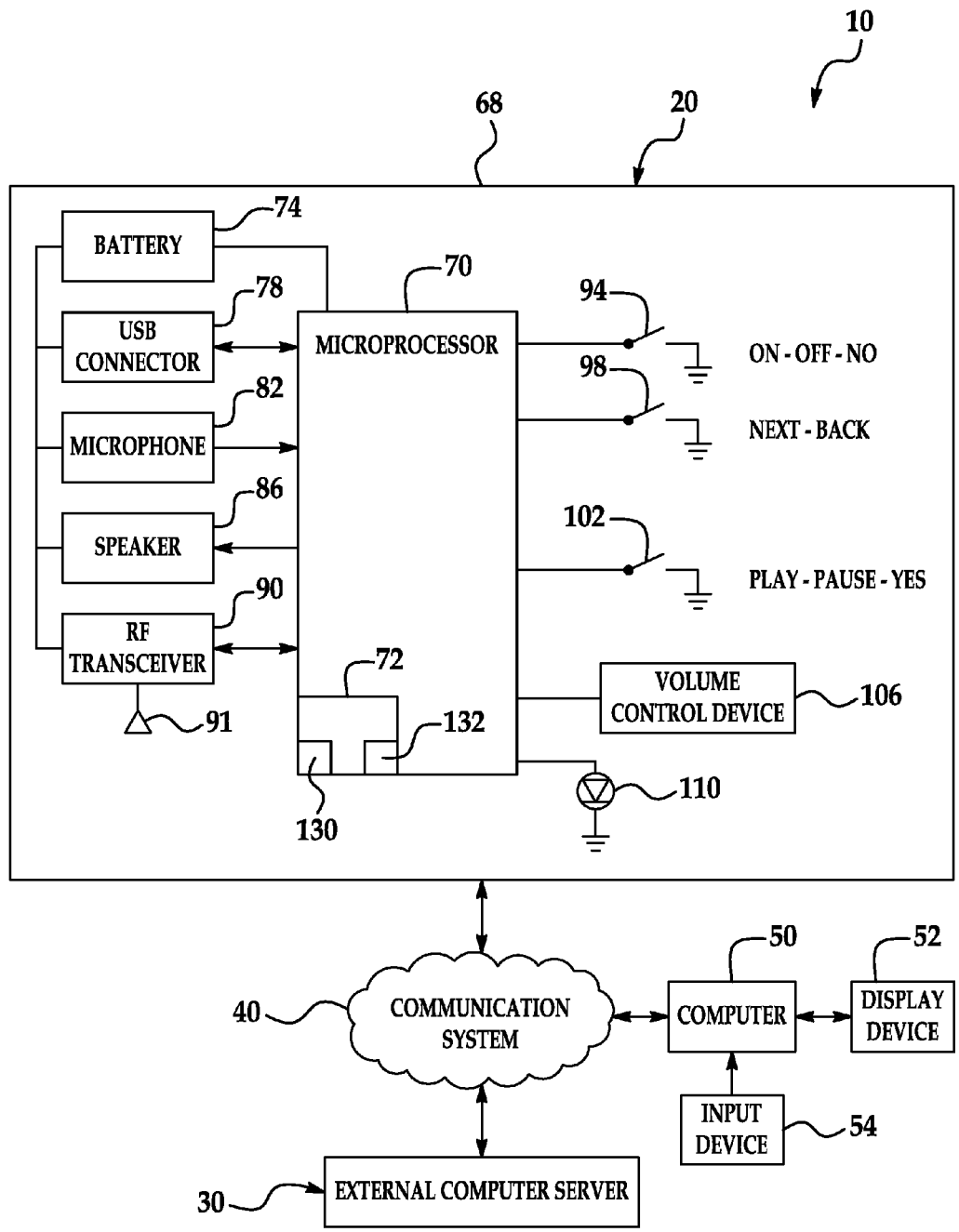
FIG. 1 is a schematic of a training system utilizing a wireless mobile training device in accordance with an exemplary embodiment.
Figure 2:
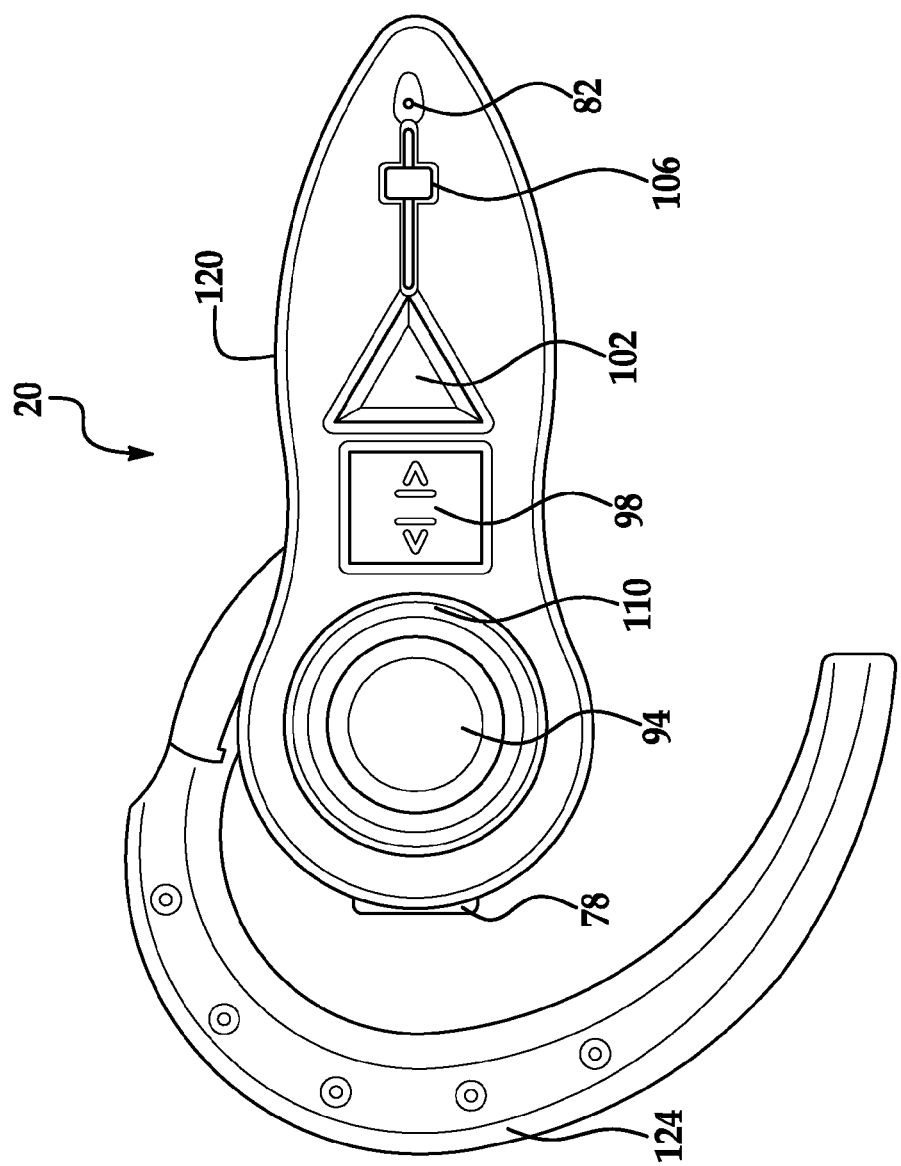
FIG. 2 is a schematic of the wireless mobile training device of FIG. 1.
Figure 3:
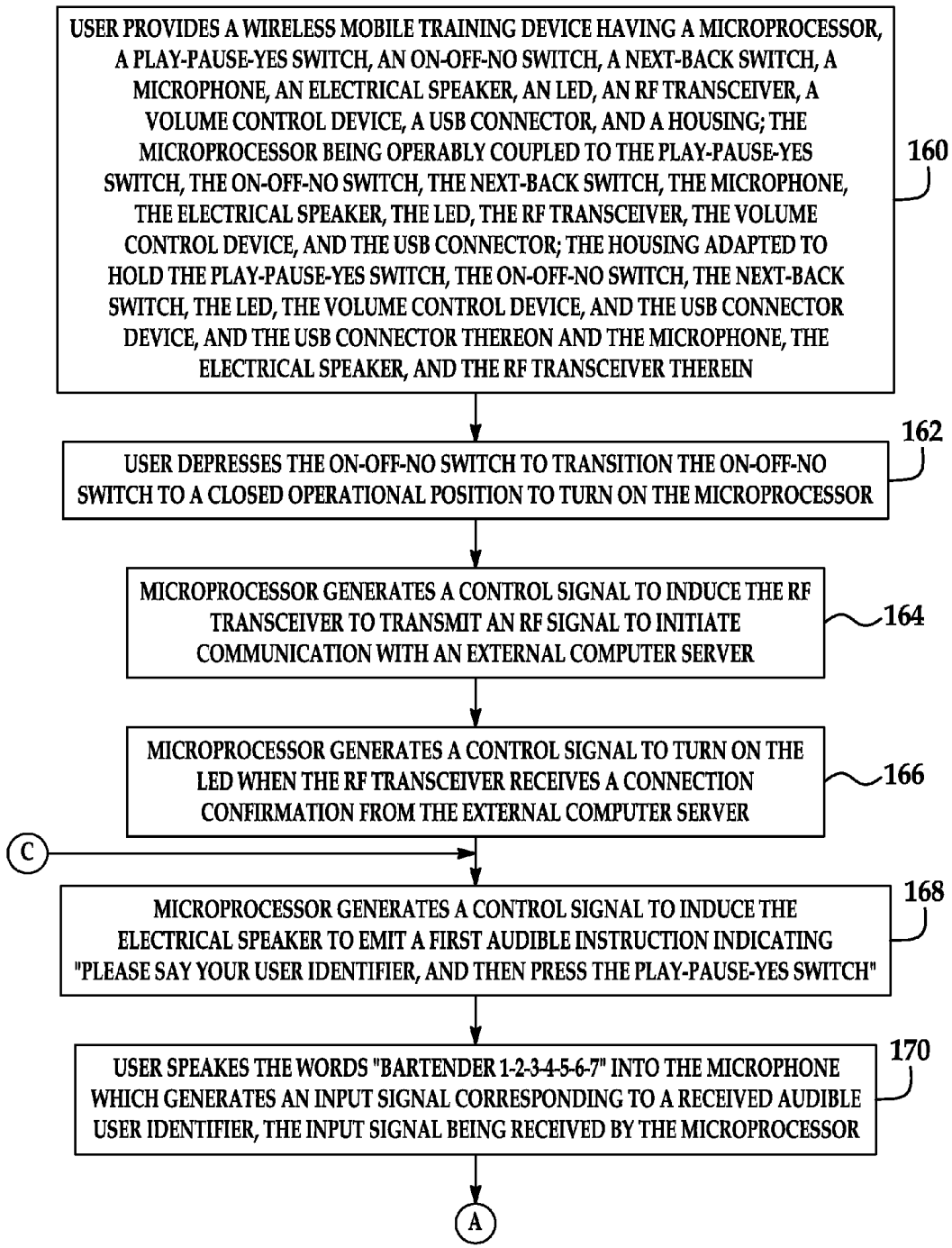
FIGS. 3-11 are flowcharts of a method for training a user utilizing the wireless mobile training device of FIG. 2 in accordance with another exemplary embodiment.
Figure 4:
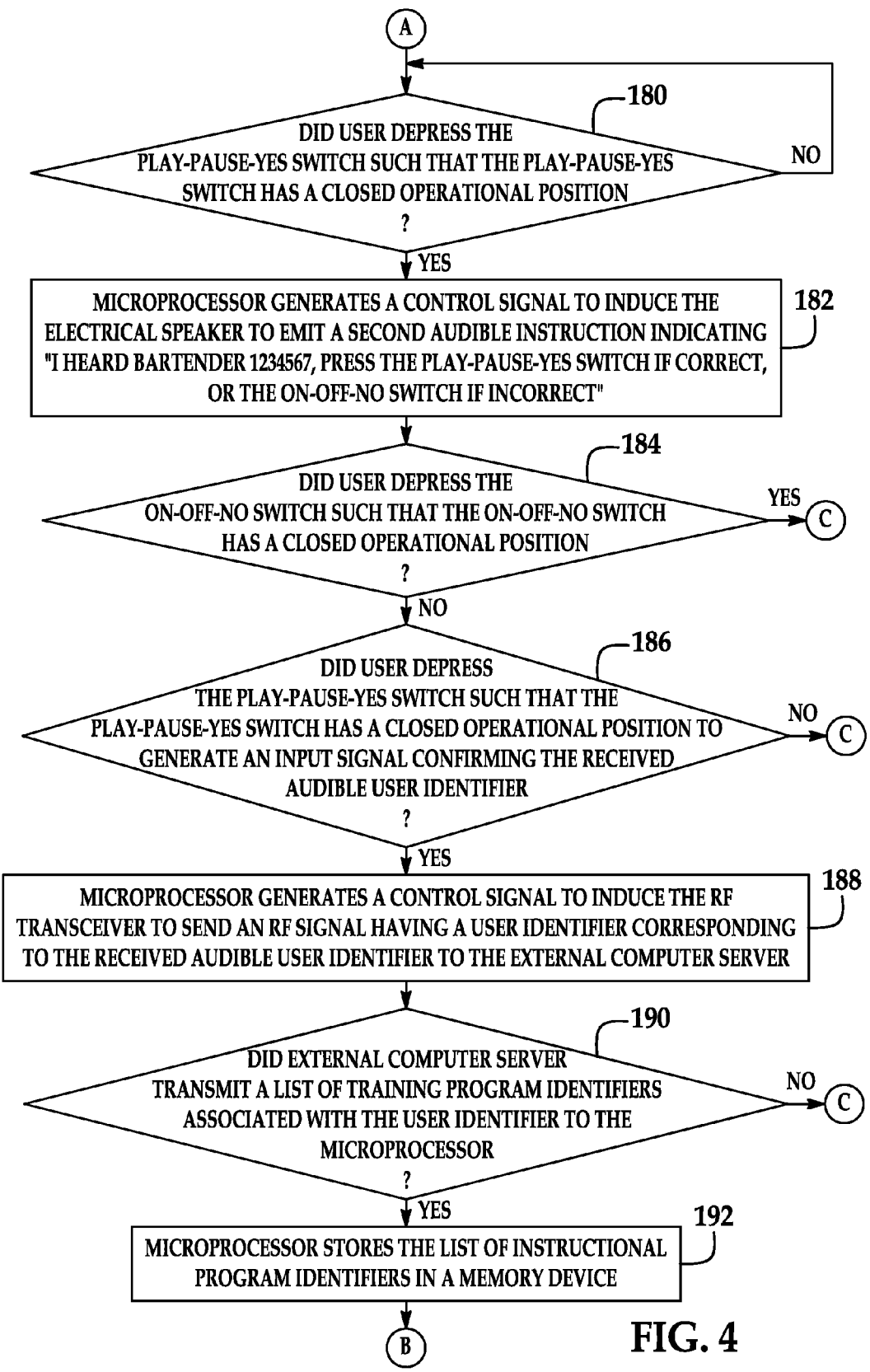
Figure 5:
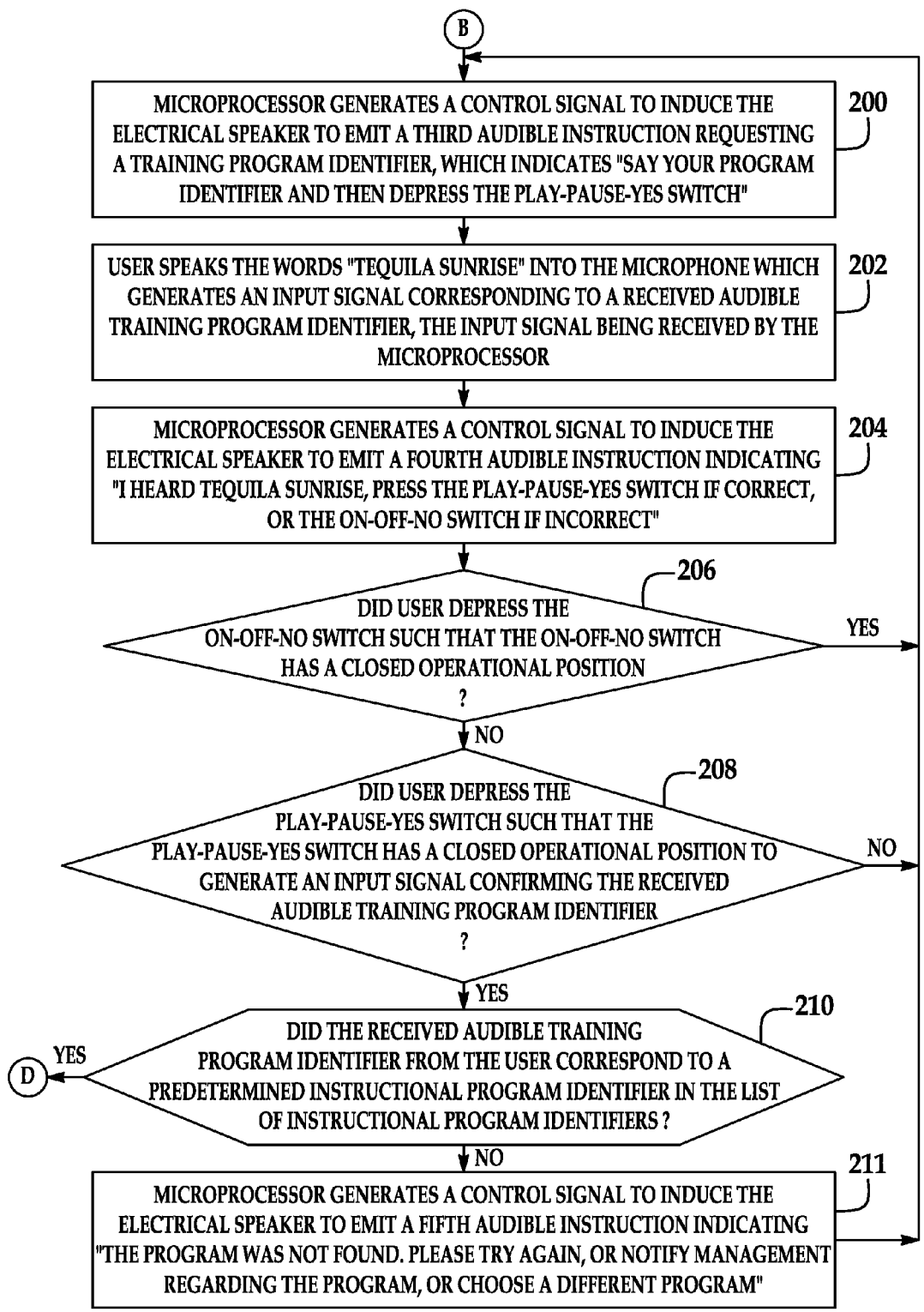
Figure 6:
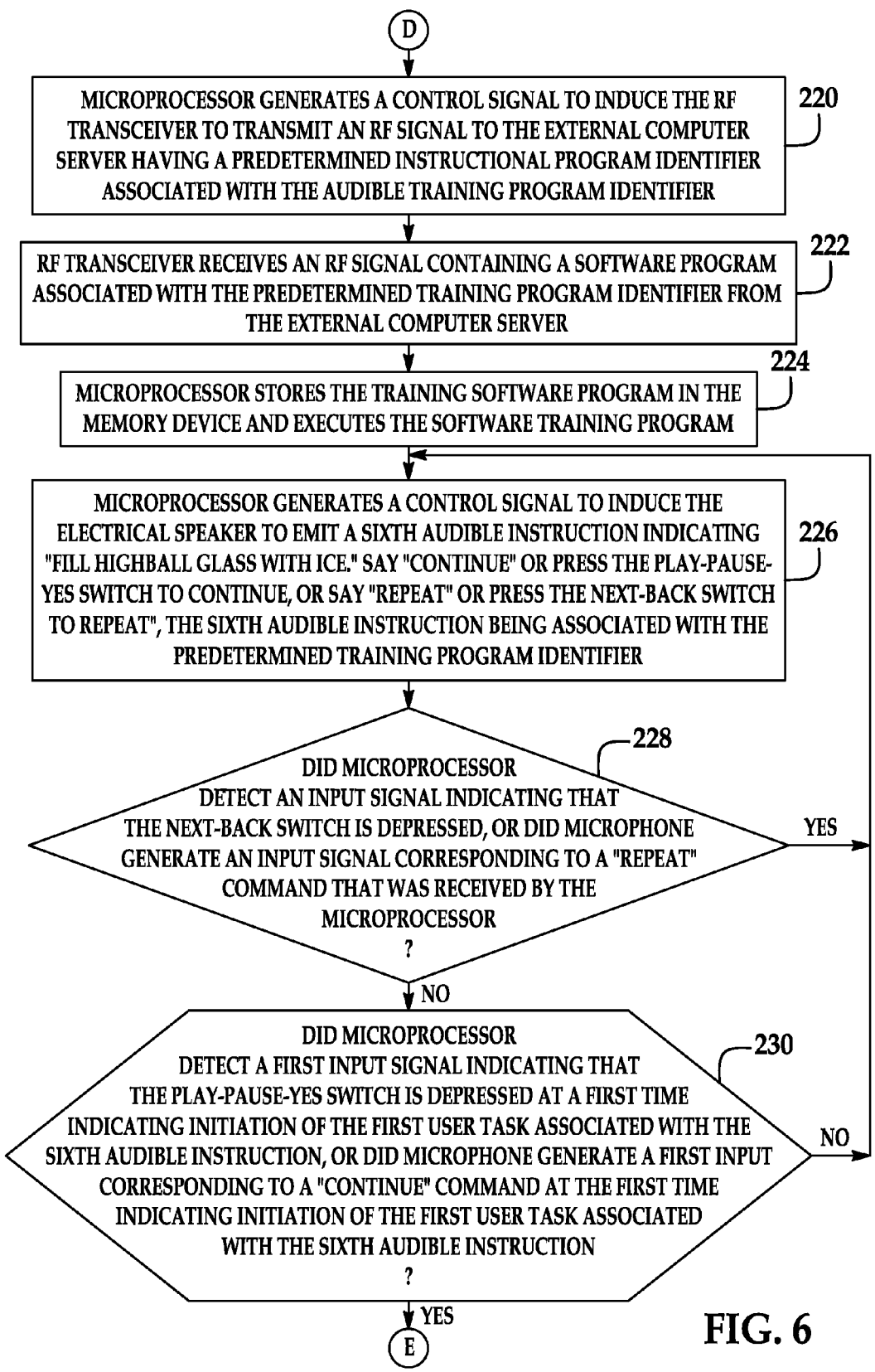
Figure 7:
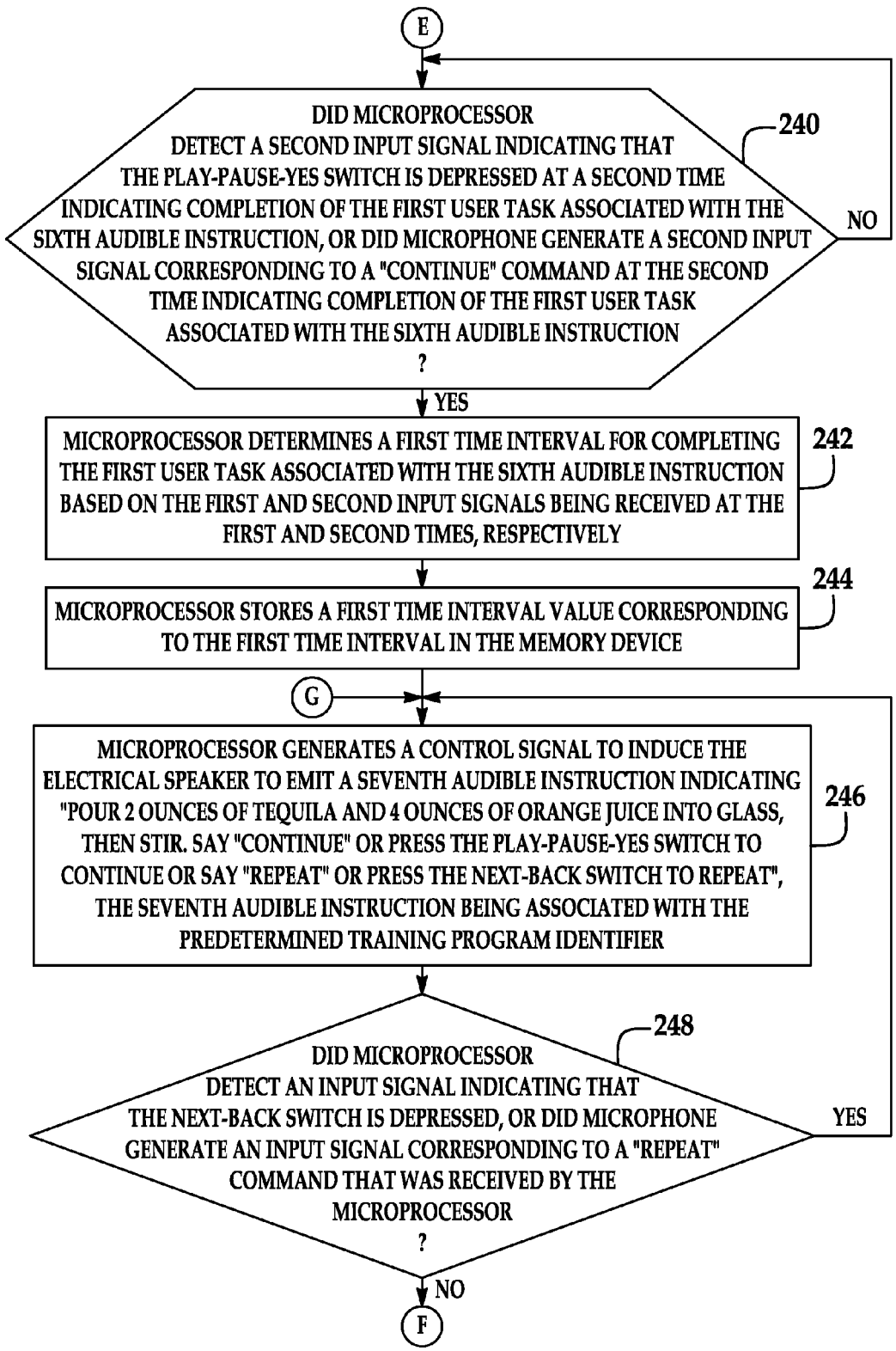
Figure 8:
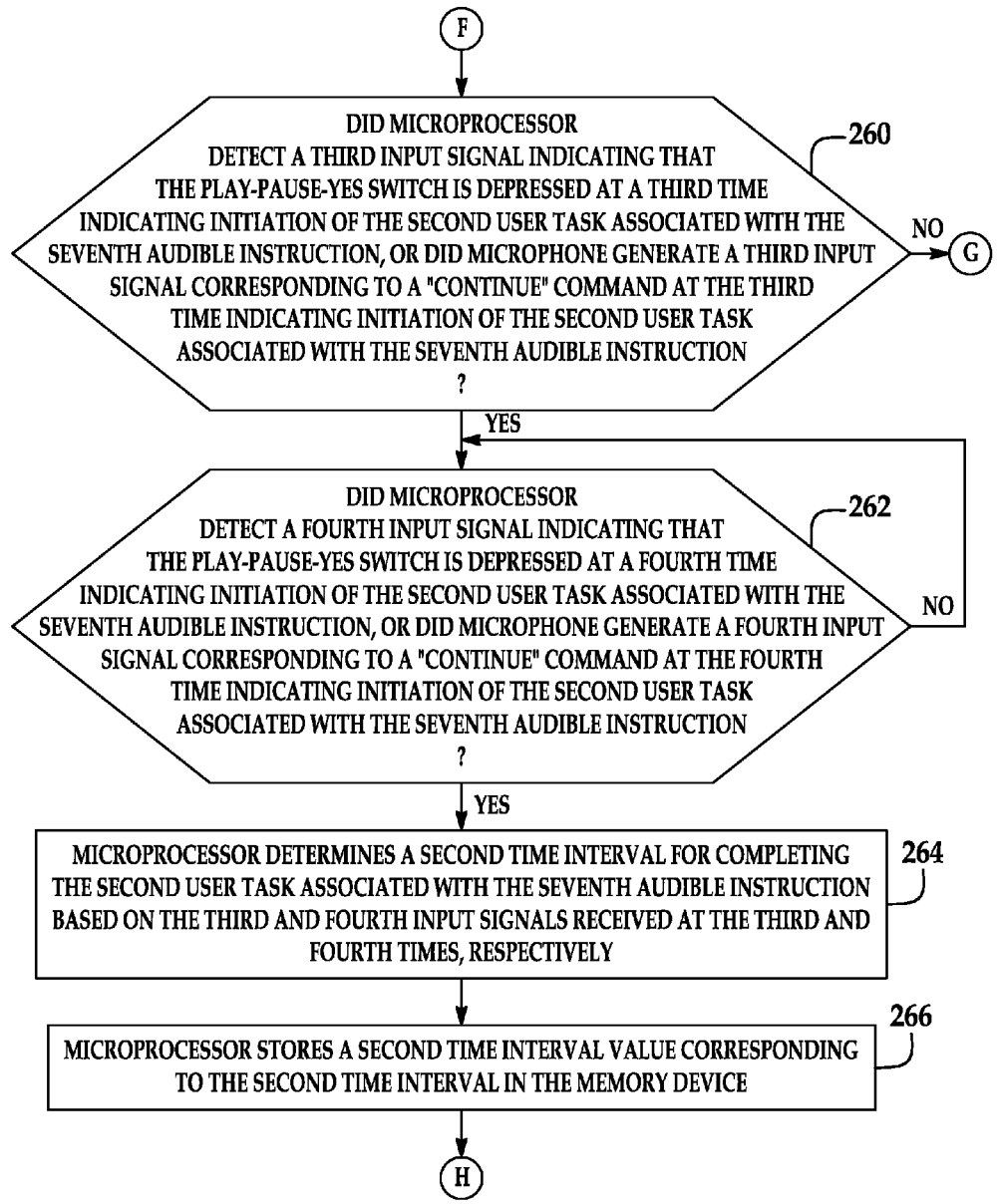
Figure 9:
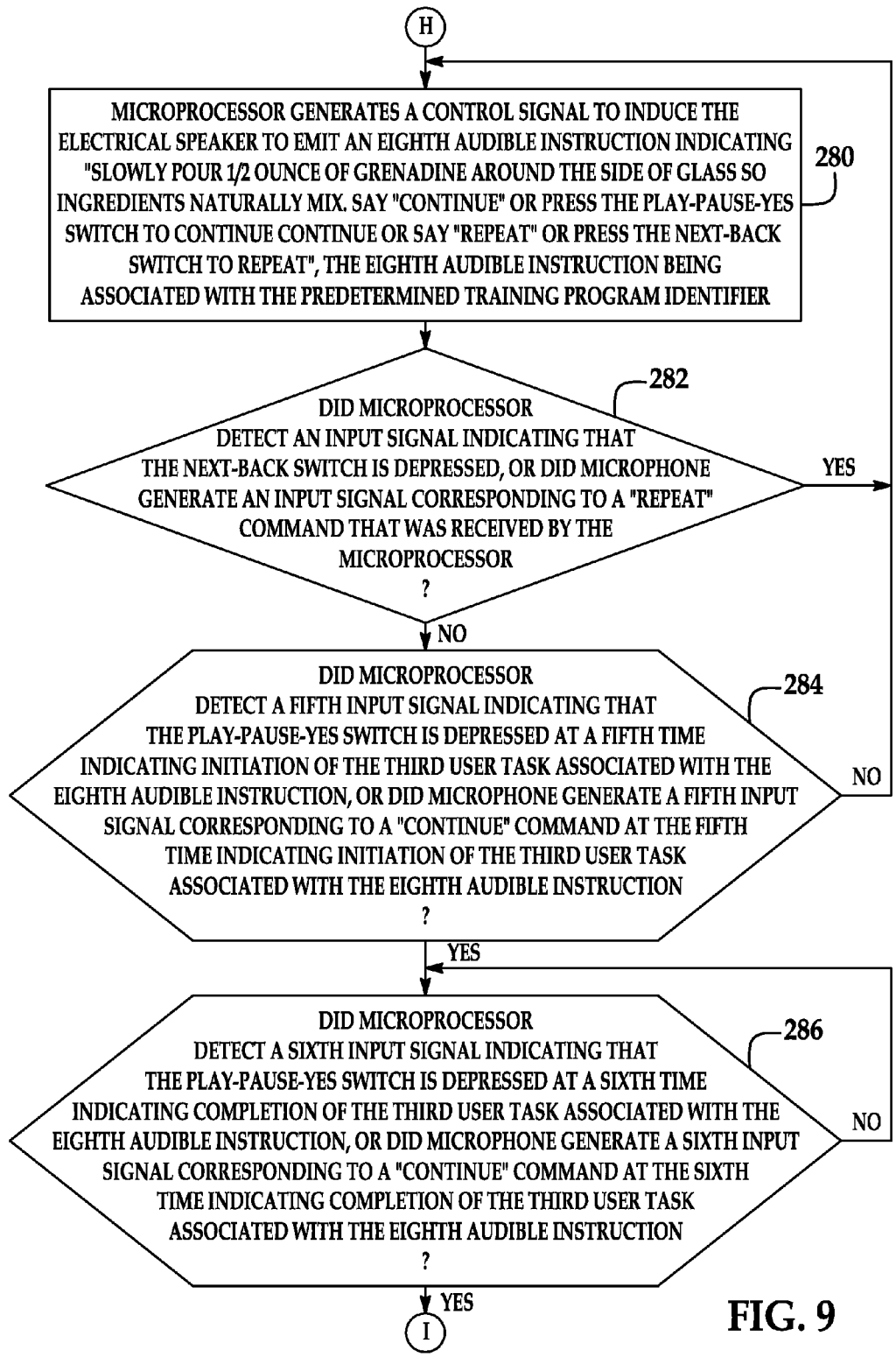
Figure 10:
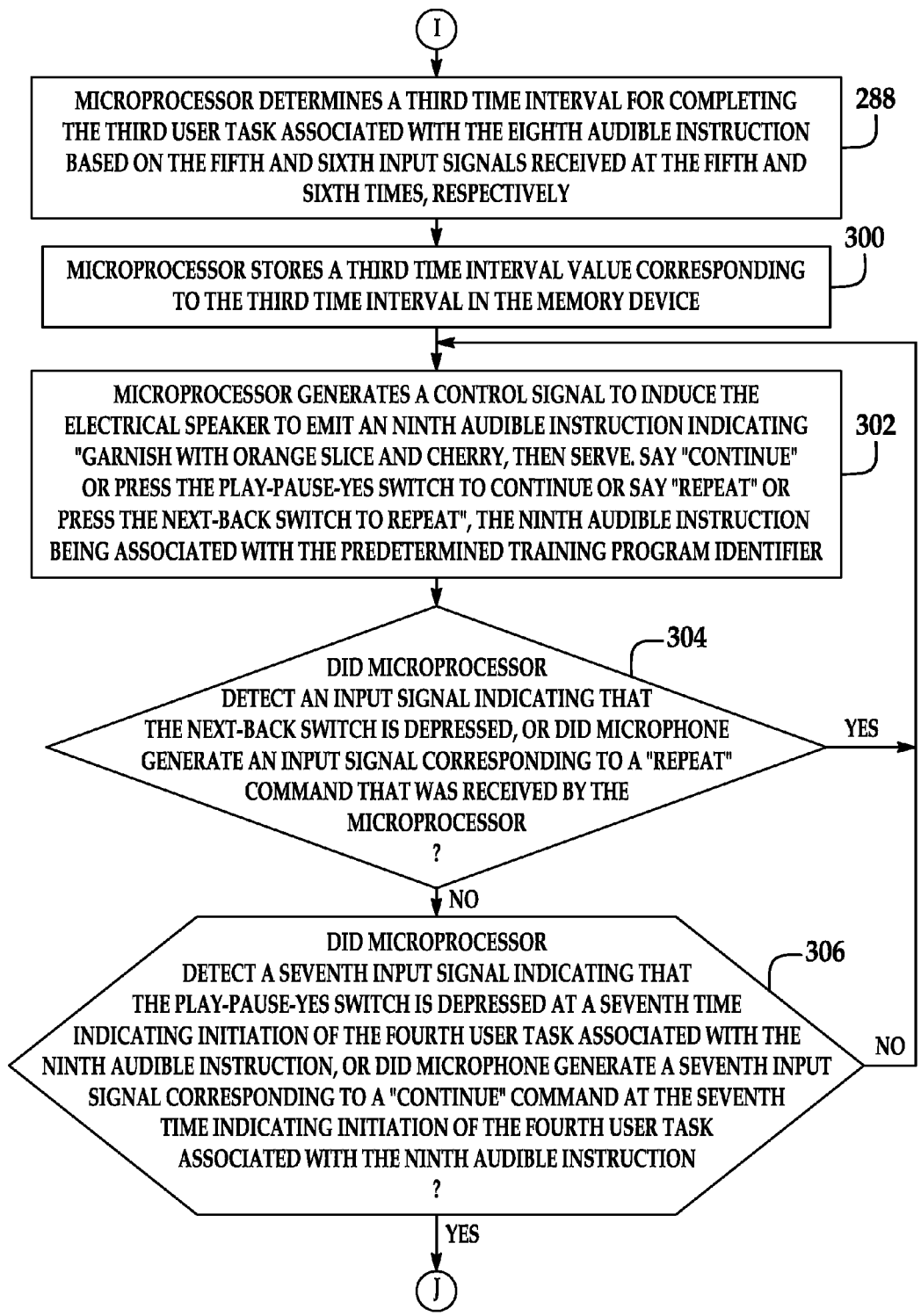
Figure 11:
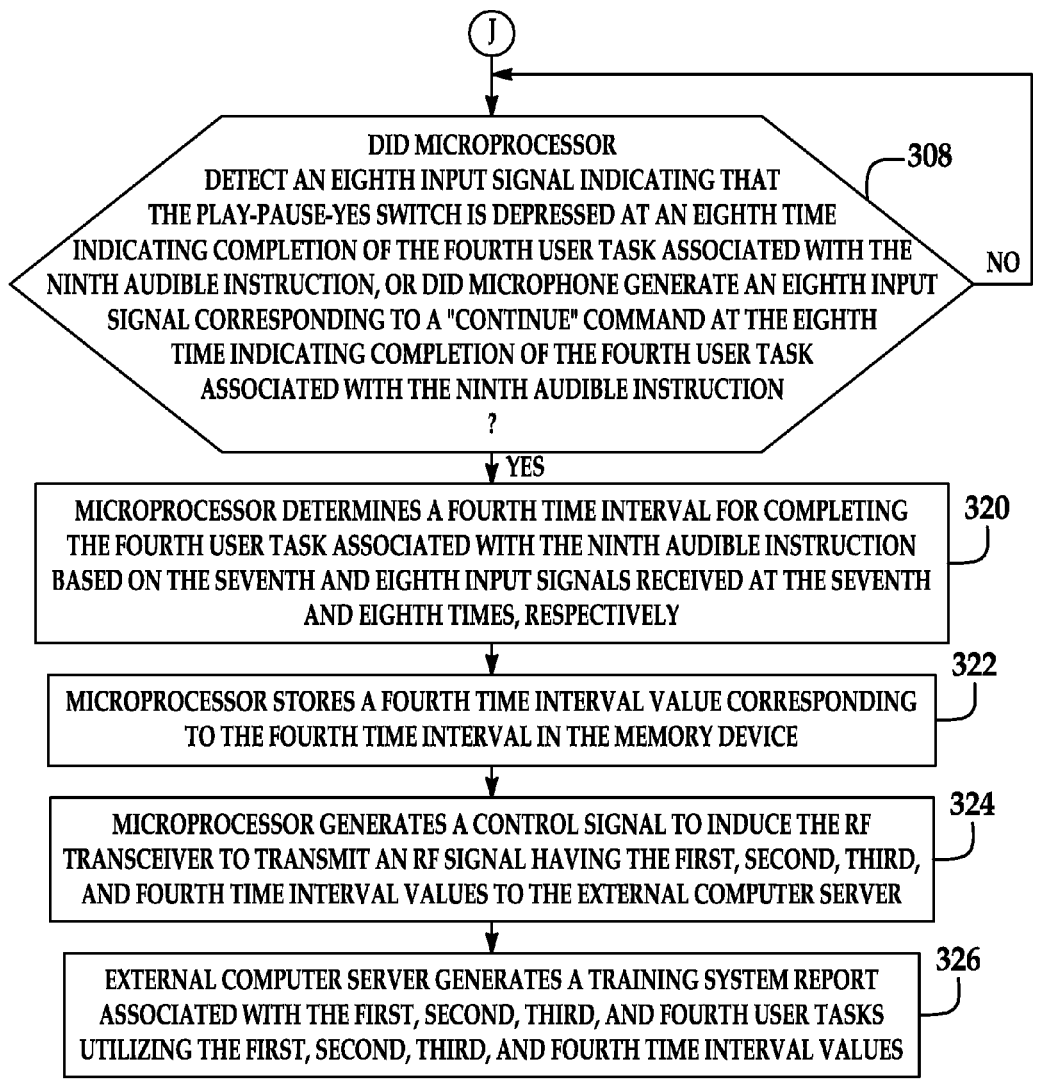

Referring to FIGS. 1 and 2, a training system 10 for training a user is illustrated. The training system 10 includes a wireless mobile training device 20 in accordance with an exemplary embodiment, an external computer server 30, a communication system 40, a computer 50, a display device 52, and an input device 54. An advantage of the training system 10 is that the training system utilizes the wireless mobile training device 20 which provides audible instructions to a user for training the user to perform predetermined tasks of a training program, and allows the user to step through the training program by utilizing audibly spoken commands or depressing switches, and monitors time interval values for performing each task.

The wireless mobile training device 20 includes a housing 68, a microprocessor 70, a battery 74, a USB connector 78, a microphone 82, an electrical speaker 86, an RF transceiver 90, an on-off-no switch 94, a next-back switch 98, a play-pause-yes switch 102, a volume control device 106, and a light emitting diode (LED) 110. In an exemplary embodiment, the wireless mobile training device 20 is a wearable training device that can be removably coupled to a human ear.

In an exemplary embodiment, the housing 68 is designed to be removably coupled to a human ear such that audible instructions can be conveyed to a user and audible input data can be received from the user. In other words, the housing 68 is a wearable housing. The housing 68 includes a housing portion 120 and an earpiece portion 124 coupled to the housing portion 120. The housing portion 120 is adapted to hold the play-pause-yes switch 102, the on-off-no switch 94, the next-back switch 98, the LED 110, the volume control device 106, and the USB connector 78 thereon. The housing portion 120 further holds the microphone 82, the electrical speaker 86, and the RF transceiver 90 therein.

The microprocessor 70 is programmed to store a training software program 130 in a memory device 72, which is received from the external computer server 30 via the communication system 40. The microprocessor 70 is further programmed to execute the training software program 130 in order to train a user to perform specific user tasks which will be described in greater detail below. The microprocessor 70 is operably coupled to the play-pause-yes switch 102, the on-off-no switch 94, the next-back switch 98, the microphone 82, the electrical speaker 86, the LED 110, the RF transceiver 90, the volume control device 106, the battery 74, and the USB connector 78. The microprocessor 70 stores software programs and associated data in the memory device 72. In particular, the microprocessor 70 stores the training software program 130 in the memory device 72. Further, microprocessor stores a voice recognition software program 132 in the memory device 72 and executes the voice recognition software program 132. The voice recognition software program 132 is provided to analyze input signals from the microphone 82 and to generate input data based upon the input signals from the microphone 82, which are used by the microprocessor 70.

The battery 74 is electrically coupled to the microprocessor 78, the microphone 82, and the RF transceiver 90 and provides an operational voltage to the microprocessor 78, the microphone 82, and the RF transceiver 90. The battery 74 is removably disposed within the housing portion 120 (shown in FIG. 2).

The USB connector 78 is electrically coupled to the microprocessor 70. The USB connector 78 is provided to allow software programs and data to be transferred to the microprocessor 70 and from the microprocessor 70 if needed. The USB connector 78 is coupled to an end of the housing portion 120.

The microphone 82 is electrically coupled to the microprocessor 70. The microphone 82 generates an input signal corresponding to received audible information from the user. The microprocessor 70 receives the input signal from the microphone 82. The microphone 82 is at least partially disposed within the housing portion 120 and receives audible information originating outside of the housing portion 120.

The electrical speaker 86 is electrically coupled to the microprocessor 70. The electrical speaker 86 receives control signals from the microprocessor 70 corresponding to audible instructions for performing user tasks associated with the training software program 130. In response to the control signals from the microprocessor 70, the electrical speaker 86 emits the audible instructions to the user. The electrical speaker 86 is at least partially disposed in the housing portion 120 and emits audible instructions which can be heard external of the housing portion 120.

The RF transceiver 90 is electrically coupled to the microprocessor 70. The RF transceiver 90 is adapted to transmit RF signals having binary data and binary commands therein in response to control signals from the microprocessor 70. Further, the RF transceiver 90 is adapted to receive RF signals having binary data and binary commands therein, and to transfer the binary data and binary commands to the microprocessor 70. In particular, the received RF signals can include the training software program 130 therein. The RF transceiver 90 is disposed in the housing portion 120 and includes an antenna 91.

The on-off-no switch 94 is electrically coupled between the microprocessor 70 and electrical ground. The on-off-no switch 94 is further operably coupled to the housing portion 120. The on-off-no switch 94 has a closed operational position and an open operational position. When a user depresses the on-off-no switch 94, the switch 94 transitions to a closed operational position and an electrical ground signal is applied to the microprocessor 70. The electrical ground signal corresponds to the "on" command, an "off" command, or a "no" command for the training software program 130. Initially, the microprocessor 70 enters an active operational mode in response to receiving an "on" command. After receiving the "on" command, when the microprocessor 70 is executing the training software program 130, the "no" command indicates that a user has entered a "no" input in response to a requested input by the training software program 130. If the microprocessor 70 is in an active operational mode, and the training software program 130 is not requesting any user input, the microprocessor 70 enters a sleep or low-power operational mode in response to receiving an "off" command or after a predetermined amount of time.

The next-back switch 98 is electrically coupled between the microprocessor 70 and electrical ground. The next-back switch 98 is further operably coupled to the housing portion 120. The next-back switch 98 has a closed operational position and an open operational position. When a user depresses the next-back switch 98, the switch 94 transitions to a closed operational position and an electrical ground signal is applied to the microprocessor 70. The electrical ground signal corresponds to either a "next" command or a "back" command for the training software program 130. When the microprocessor 70 is executing the training software program 130 and induces the speaker 92 to emit an audible instruction indicating that the audible instruction can be repeated by depressing the next-back switch 98, if the user depresses the next-back switch 98, the prior audible instruction is repeated to the user.

The play-pause-yes switch 102 is electrically coupled between the microprocessor 70 and electrical ground. The play-pause-yes switch 102 is further operably coupled to the housing portion 120. The play-pause-yes switch 102 has a closed operational position and an open operational position. When a user depresses the play-pause-yes switch 102, the switch 102 transitions to a closed operational position and an electrical ground signal is applied to the microprocessor 70. The electrical ground signal corresponds to a "play" command, a "pause" command or a "yes" command for controlling the training software program 130.

The volume control device 106 is electrically coupled to the microprocessor 70. The volume control device 106 is further operably coupled to the housing portion 120. The volume control device 106 allows the user to either increase or decrease a volume of audible instructions emitted from the electrical speaker 86.

The LED 110 is electrically coupled between the microprocessor 70 and electrical ground. The LED 110 is further operably coupled to the housing portion 120. The LED 110 emits light in response to receiving a control signal from the microprocessor 70.

Referring to FIGS. 1 and 12, the external computer server 30 is programmed to store a plurality of training software programs therein. The external computer server 30 is further programmed to operably communicate with the wireless mobile training device 20 and the computer 50 via the communication system 40. The external computer server 30 is further programmed to authenticate user identifiers based on user identifiers received from the wireless mobile training device 20. The external computer server 30 is further programmed to verify training program identifiers received from the wireless mobile training device 20 and to transmit software training programs corresponding to the training program identifiers to the wireless mobile training device 20. The external computer server 30 is further programmed to receive data from the wireless mobile training device 20 corresponding to time intervals for completing user tasks, and to generate a training system report 400 (shown in FIG. 12) based on the time intervals.

The computer 50 is programmed to operably communicate with the external computer server 30 via the communication system 40. The computer 50 is operably coupled to the input device 54 and the display device 52. The computer 50 is programmed to allow user to request the training system report 400 from the external computer server 30 and to display the training system report 400 on the display device 52.

Referring to FIGS. 1-11, a flowchart of a method for training a user utilizing the wireless mobile training device 20 in accordance with another exemplary embodiment will now be described.

At step 160, the user provides the wireless mobile training device 20 having the microprocessor 70, the play-pause-yes switch 102, the on-off-no switch 94, a next-back switch, the microphone 82, the electrical speaker 86, the LED 110, the RF transceiver 90, the volume control device 106, the USB connector 78, and the housing 68. The microprocessor 70 is operably coupled to the play-pause-yes switch 102, the on-off-no switch 94, the next-back switch 98, the microphone 82, the electrical speaker 86, the LED 110, the RF transceiver 90, the volume control device 106, and the USB connector 78. The housing 68 is adapted to hold the play-pause-yes switch 102, the on-off-no switch 94, the next-back switch 98, the LED 110, the volume control device 106, and the USB connector 78 thereon and the microphone 82, the electrical speaker 86, and the RF transceiver 90 therein. After step 160, the method advances to step 162.

At step 162, the user depresses the on-off-no switch 94 to transition the on-off-no switch 94 to a closed operational position to turn on the microprocessor 70. After step 162, the method advances to step 164.

At step 164, the microprocessor 70 generates a control signal to induce the RF transceiver 90 to transmit an RF signal to initiate communication with the external computer server 30. After step 164, the method advances to step 166.

At step 166, the microprocessor 70 generates a control signal to turn on the LED 110 when the RF transceiver 90 receives a connection confirmation from the external computer server. After step 166, the method advances to step 168.

At step 168, the microprocessor 70 generates a control signal to induce the electrical speaker 86 to emit a first audible instruction indicating "Please say your user identifier, and then press the play-pause-yes switch." After step 168, the method advances to step 170.

At step 170, the user speaks the words "Bartender 1-2-3-4-5-6-7" into the microphone 82 which generates an input signal corresponding to a received audible user identifier. The input signal is received by the microprocessor 70. After step 170, the method advances to step 180.

At step 180, the microprocessor 70 makes a determination as to whether the user depressed the play-pause-yes switch 102 such that the play-pause-yes switch 102 has a closed operational position. If the value of step 180 equals "yes", the method advances to step 182. Otherwise, the method returns to step 180.

At step 182, the microprocessor 70 generates a control signal to induce the electrical speaker 86 to emit a second audible instruction indicating "I heard Bartender1234567, press the play-pause-yes switch if correct, or the on-off-no switch if incorrect." After step 182, the method advances to step 184.

At step 184, the microprocessor 70 makes a determination as to whether the user depressed the on-off-no switch 94 such that the on-off-no switch 94 has a closed operational position. If the value of step 184 equals "yes", the method returns to step 168. Otherwise, the method advances to step 186.

At step 186, the microprocessor 70 makes a determination as to whether the user depressed the play-pause-yes switch 102 such that the play-pause-yes switch 102 has a closed operational position to generate an input signal confirming the received audible user identifier. If the value of step 186 equals "yes", the method advances to step 188. Otherwise, the method returns to step 168.

At step 188, the microprocessor 70 generates a control signal to induce the RF transceiver 90 to send an RF signal having a user identifier corresponding to a received audible user identifier to the external computer server 30. After step 188, the method advances to step 190.

At step 190, the microprocessor 70 makes a determination as to whether the external computer server 30 transmitted a list of training program identifiers associated with the user identifier to the microprocessor 70. In particular, the external computer server 30 can transmit the list of training program identifiers to the communication system 40 which further generates an RF signal that contains the list of training program identifiers. The RF signal having the list of training program identifiers can be received by the RF transceiver 90 of the wireless mobile training device 20. If the value of step 190 equals "yes", the method advances to step 192. Otherwise, the method returns the step 168.

At step 192, the microprocessor 70 stores the list of training program identifiers in the memory device 72. After step 192, the method advances to step 200.

At step 200, the microprocessor 70 generates a control signal to induce the electrical speaker 86 to emit a third audible instruction requesting a training program identifier, which indicates "Say your program identifier and then depress the play-pause-yes switch." After step 200, the method advances to step 202.

At step 202, the user speaks the words "Tequila Sunrise" into the microphone 82 which generates an input signal corresponding to a received audible training program identifier. The input signal is received by the microprocessor 70. After step 202, the method advances to step 204.

At step 204, the microprocessor 70 generates a control signal to induce the electrical speaker 86 to emit a fourth audible instruction indicating "I heard Tequila Sunrise, press the play-pause-yes switch if correct, or the on-off-no switch if incorrect." After step 204, the method advances to step 206.

At step 206, the microprocessor 70 makes a determination as to whether the user depressed the on-off-no switch 94 such that the on-off-no switch 94 has a closed operational position. If the value of step 206 equals "no", the method advances to step 208. Otherwise, the method returns to step 200.

At step 208, the microprocessor 70 makes a determination as to whether the user depressed the play-pause-yes switch 102 such that the play-pause-yes switch 102 has a closed operational position to generate an input signal confirming the received audible training program identifier. If the value of step 208 equals "yes", the method advances to step 210. Otherwise, the method returns to step 200.

At step 210, the microprocessor 70 makes a determination as to whether the received audible training program identifier corresponds to a predetermined training program identifier in the list of training program identifiers. If the value of step 210 equals "yes", the method advances to step 220. Otherwise, the method advances to step 211.

At step 211, the microprocessor 70 generates a control signal to induce the electrical speaker 86 to emit a fifth audible instruction indicating "The program was not found.

Please try again, or notify management regarding the program, or choose another program." After step 211, the method returns to step 200.

At step 220, the microprocessor 70 generates a control signal to induce the RF transceiver 90 to transmit an RF signal to the external computer server 30 having a predetermined training program identifier associated with the audible training program identifier. After step 220, the method advances to step 222.

At step 222, the RF transceiver 90 receives an RF signal containing a software program associated with the predetermined training program identifier from the external computer server 30. After step 222, the method advances to step 224.

At step 224, the microprocessor 70 stores the training software program 130 in the memory device 72 and executes the software training program 130. After step 224, the method advances to step 226.

At step 226, the microprocessor 70 generates a control signal to induce the electrical speaker 86 to emit a sixth audible instruction indicating "Fill highball glass with ice. Say "continue" or press the play-pause-yes switch to continue, or say "repeat" or press the next-back switch to repeat." The sixth audible instruction is associated with the predetermined training program identifier.

At step 228, the microprocessor 70 makes a determination as to whether the microprocessor 70 detected an input signal indicating that the next-back switch 98 is depressed, or whether the microphone 82 generated an input signal corresponding to a "repeat" command that was received by the microprocessor 70. If the value of step 228 equals "no", the method advances to step 230. Otherwise, the method returns to step 226.

At step 230, the microprocessor 70 makes a determination as to whether the microprocessor 70 detected a first input signal indicating that the play-pause-yes switch 102 is depressed at a first time indicating initiation of the first user task associated with the sixth audible instruction, or whether the microphone 82 generated a first input signal corresponding to a "continue" command at the first time indicating initiation of the first user task associated with the sixth audible instruction. If the value of step 230 equals "yes", the method advances to step 240. Otherwise, the method returns to step 226.

At step 240, the microprocessor 70 makes a determination as to whether the microprocessor 70 detected a second input signal indicating that the play-pause-yes switch 102 is depressed at a second time indicating completion of the first user task associated with the sixth audible instruction, or whether the microphone 82 generated a second input signal corresponding to a "continue" command at the second time indicating completion of the first user task associated with the sixth audible instruction. If the value of step 240 equals "yes", the method advances to step 242. Otherwise, the method returns to step 240.

At step 242, the microprocessor 70 determines a first time interval for completing the first user task associated with the sixth audible instruction based on the first and second input signals being received at the first and second times, respectively. In particular, the first time interval is calculated utilizing the following equation: first time interval=second time−first time. After step 242, the method advances to step 244.

At step 244, the microprocessor 70 stores a first time interval value corresponding to the first time interval in the memory device 72. After step 244, the method advances to step 246.

At step 246, the microprocessor 70 generates a control signal to induce the electrical speaker 86 to emit a seventh audible instruction indicating "Pour 2 ounces of tequila and 4 ounces of orange juice into glass, then stir. Say "continue" or press the play-pause-yes switch to continue or say "repeat" or press the next-back switch to repeat." The seventh audible instruction is associated with the predetermined training program identifier. After step 246, the method advances to step 248.

At step 248, the microprocessor 70 makes a determination as to whether the microprocessor 70 detected an input signal indicating that the next-back switch 98 is depressed, or whether the microphone 82 generated an input signal corresponding to a "repeat" command that was received by the microprocessor 70. If the value of step 248 equals "no", the method advances to step 260. Otherwise, the method returns to step 246.

At step 260, the microprocessor 70 makes a determination as to whether the microprocessor 70 detected a third input signal indicating that the play-pause-yes switch 102 is depressed at a third time indicating initiation of the second user task associated with the seventh audible instruction, or whether the microphone 82 generated a third input signal corresponding to a "continue" command at the third time indicating initiation of the second user task associated with the seventh audible instruction. If the value of step 260 equals "yes", the method advances to step 262. Otherwise, the method returns to step 246.

At step 262, the microprocessor 70 makes a determination as to whether the microprocessor 70 detected a fourth input signal indicating that the play-pause-yes switch 102 is depressed at a fourth time indicating completion of the second user task associated with the seventh audible instruction, or whether the microphone 82 generated a fourth input signal corresponding to a "continue" command at the fourth time indicating completion of the second user task associated with the seventh audible instruction. If the value of step 262 equals "yes", the method advances to step 264. Otherwise, the method returns to step 262.

At step 264, the microprocessor 70 determines a second time interval for completing the second user task associated with the seventh audible instruction based on the third and fourth input signals received at the third and fourth times, respectively. In particular, the second time interval is calculated utilizing the following equation: second time interval=fourth time−third time. After step 264, the method advances to step 266.

At step 266, the microprocessor 70 stores a second time interval value corresponding to the second time interval in the memory device 72. After step 266, the method advances to step 280.

At step 280, the microprocessor 70 generates a control signal to induce the electrical speaker 86 to emit an eighth audible instruction indicating "Slowly pour ½ ounce of grenadine around the side of glass so ingredients naturally mix. Say "continue" or press the play-pause-yes switch to continue or say "repeat" or press the next-back switch to repeat." The eighth audible instruction is associated with the predetermined training program identifier. After step 280, the method advances to step 282.

At step 282, the microprocessor 70 makes a determination as to whether the microprocessor 70 detected an input signal indicating that the next-back switch 98 is depressed, or whether the microphone 82 generated an input signal corresponding to a "repeat" command that was received by the microprocessor 70. If the value of step 282 equals "no", the method advances step 284. Otherwise, the method returns to step 280.

At step 284, the microprocessor 70 makes a determination as to whether the microprocessor 70 detected a fifth input signal indicating that the play-pause-yes switch 102 is depressed at a fifth time indicating initiation of a third user task associated with the eighth audible instruction, or whether the microphone 82 generated a fifth input signal corresponding to a "continue" command at the fifth time indicating initiation of the third user task associated with the eighth audible instruction. If the value of step 284 equals "yes", method advances to step 286. Otherwise, the method returns to step 280.

At step 286, the microprocessor 70 makes a determination as to whether the microprocessor 70 detected a sixth input signal indicating that the play-pause-yes switch 102 is depressed at a sixth time indicating completion of the third user task associated with the eighth audible instruction, or whether the microphone 82 generated a sixth input signal corresponding to a "continue" command at the sixth time indicating completion of the third user task associated with the eighth audible instruction. If the value of step 286 equals "yes", the method advances to step 288. Otherwise, the method returns to step 286.

At step 288, the microprocessor 70 determines a third time interval for completing the third user task associated with the eighth audible instruction based on the fifth and sixth input signals being received at the fifth and sixth times, respectively. In particular, the third time interval is calculated utilizing the following equation: third time interval=sixth time−fifth time. After step 288, the method advances to step 300.

At step 300, the microprocessor 70 stores a third time interval value corresponding to the third time interval in the memory device 72. After step 300, the method advances to step 302.

At step 302, the microprocessor 70 generates a control signal to induce the electrical speaker 86 to emit a ninth audible instruction indicating "Garnish with orange slice and cherry, then serve. Say "continue" or press the play-pause-yes switch to continue or say "repeat" or press the next-back switch to repeat." The ninth audible instruction is associated with the predetermined training program identifier. After step 302, the method advances to step 304.

At step 304, the microprocessor 70 makes a determination as to whether the microprocessor 70 detected an input signal indicating that the next-back switch 98 is depressed, or whether the microphone 82 generated an input signal corresponding to a "repeat" command that was received by the microprocessor 70. If the value of step 304 equals "no", the method advances to step 306. Otherwise, the method returns to step 302.

At step 306, the microprocessor 70 makes a determination as to whether the microprocessor 70 detected a seventh input signal indicating that the play-pause-yes switch 102 is depressed at a seventh time indicating initiation of a fourth user task associated with the ninth audible instruction, or whether the microphone 82 generated a seventh input signal corresponding to a "continue" command at the seventh time indicating initiation of the fourth user task associated with the ninth audible instruction. If the value of step 306 equals "yes", the method advances to step 308. Otherwise, the method returns to step 302.

At step 308, the microprocessor 70 makes a determination as to whether the microprocessor 70 detected an eighth input signal indicating that the play-pause-yes switch 102 is depressed at an eighth time indicating completion of the fourth user task associated with the ninth audible instruction, or whether the microphone 82 generated an eighth input signal corresponding to a "continue" command at the eighth time indicating completion of the fourth user task associated with the ninth audible instruction. If the value of step 308 equals "yes", the method advances to step 320. Otherwise, the method returns to step 308.

At step 320, the microprocessor 70 determines a fourth time interval for completing the fourth user task associated with the ninth audible instruction based on the seventh and eighth input signals being received at the seventh and eighth times, respectively. In particular, the fourth time interval is calculated utilizing the following equation: fourth time interval=eighth time−seventh time. After step 320, the method advances to step 322.

At step 322, the microprocessor 70 stores a fourth time interval value corresponding to the fourth time interval in the memory device 72. After step 322, the method advances to step 324.

At step 324, the microprocessor 70 generates a control signal to induce the RF transceiver 90 to transmit an RF signal having the first, second, third, and fourth time interval values to the external computer server 30. After step 324, the method advances to step 326.

At step 326, the external computer server 30 generates the training system report 400 associated with the first, second, third, and fourth user tasks utilizing the first, second, third, and fourth time interval values.

The above-described method can be at least partially embodied in the form of one or more computer readable media having computer-executable instructions for practicing the method. The computer-readable media can comprise one or more of the following: hard drives, flash memory, CD-ROMs, and other computer-readable media known to those skilled in the art; wherein, when the computer-executable instructions are loaded into and executed by one or more microprocessors or computers, the one or more microprocessors or computers are programmed for practicing at least a portion of the method.

The wireless mobile training device and the method described herein provide substantial advantages over other devices and methods. In particular, the wireless mobile training device is a wearable device that provides audible instructions to a user for training a user to perform predetermined tasks of a training program, allows the user to step through the training program utilizing audible commands or depressing switches, and monitors time interval values for performing each task.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:
1. A wireless mobile training device, comprising:
a microprocessor;

a first switch, a microphone, an RF transceiver, a memory device, and an electrical speaker operably coupled to the microprocessor;

a housing having a housing portion and an arcuate-shaped earpiece portion, the arcuate-shaped earpiece portion having a first end and a second end, the first end of the arcuate-shaped earpiece portion being coupled to and extending from the housing portion, the housing portion being adapted to hold the microprocessor, the first switch, the microphone, and the electrical speaker therein;

the microprocessor being programmed to generate a first control signal to induce the electrical speaker to emit a first audible instruction of words requesting a training program name;

the microphone adapted to receive audible words corresponding to an audible training program name and to generate a first input signal in response to the audible training program name, the first input signal being received by the microprocessor;

the microprocessor being further programmed to generate a second control signal to induce the RF transceiver to transmit an RF signal having a predetermined program identifier associated with the audible training program name;

the RF transceiver adapted to receive an RF signal having a training software program associated with the predetermined program identifier;

the microprocessor being further programmed to store the training software program in the memory device and to execute the training software program;

the microprocessor being further programmed to generate a third control signal to induce the electrical speaker to emit a second audible instruction of words associated with a first user task;

the microprocessor being further programmed to receive a second input signal indicating initiation of the first user task associated with the second audible instruction of words from either the first switch or the microphone;

the microprocessor being further programmed to receive a third input signal indicating completion of the first user task associated with the second audible instruction of words from either the first switch or the microphone;

the microprocessor being further programmed to determine a first time interval for completing the first user task associated with the second audible instruction of words based on the second and third input signals;

the microprocessor being further programmed to store a first time interval value corresponding to the first time interval in the memory device;

the microprocessor being further programmed to generate a fourth control signal to induce the electrical speaker to emit a third audible instruction of words associated with a second user task;

the microprocessor being further programmed to receive a fourth input signal indicating initiation of the second user task associated with the third audible instructions of words from either the first switch or the microphone;

the microprocessor being further programmed to receive a fifth input signal indicating completion of the second user task associated with the third audible instruction of words from either the first switch or the microphone;

the microprocessor being further programmed to determine a second time interval for completing the second user task associated with the third audible instruction of words based on the fourth and fifth input signals; and the microprocessor being further programmed to store the second time interval value in the memory device.

2. The wireless mobile training device of claim wherein:
the microprocessor being further programmed to generate a fifth control signal to induce the RF transceiver to transmit an RF signal to initiate communication with an external computer server.

3. The wireless mobile training device of claim 2, wherein:
the microprocessor being further programmed to generate a sixth control signal to induce the electrical speaker to emit a fourth audible instruction of words requesting a user name;
the microphone adapted to generate a sixth input signal corresponding to a received audible user name, the sixth input signal being received by the microprocessor;
the microprocessor being further programmed to determine if the received audible user name is confirmed by a user based on a seventh input signal received from the first switch or the microphone;
the microprocessor being further programmed to generate a seventh control signal to induce the RF transceiver to send an RF signal having a user name associated with the received audible user name to the external computer server; and
the microprocessor being further programmed to receive an RF signal having a list of training program names associated with the user name.

4. The wireless mobile training device of claim 2, wherein:
the microprocessor being further programmed to generate a sixth control signal to induce the RF transceiver to transmit an RF signal having the first time interval value therein to the external computer server.

5. A method for training a user utilizing a wireless mobile training device, the wireless mobile training device having a microprocessor, a first switch, a microphone, an RF transceiver, a memory device, an electrical speaker, and a housing; the microprocessor being operably coupled to the first switch, the microphone, and the electrical speaker; the housing having a housing portion and an arcuate-shaped earpiece portion, the arcuate-shaped earpiece portion having a first end and a second end, the first end of the arcuate-shaped earpiece portion being coupled to and extending from the housing portion, the housing portion being adapted to hold the microprocessor, the first switch, the microphone, the RF receiver, the memory device, and the electrical speaker therein; the method comprising:

coupling the housing portion of the wireless mobile training device to a human ear utilizing the arcuate-shaped earpiece portion;

generating a first control signal to induce the electrical speaker to emit a first audible instruction of words requesting a training program name utilizing the microprocessor;

receiving audible words corresponding to an audible training program name utilizing the microphone, and generating a first input signal corresponding to the audible training program name utilizing the microphone, the first input signal being received by the microprocessor;

generating a second control signal to induce the RF transceiver to transmit an RF signal having a predetermined program identifier associated with the audible training program name, utilizing the microprocessor;

receiving an RF signal having a training software program associated with the predetermined program identifier utilizing the RF transceiver;

storing the training software program in the memory device and executing the training software program utilizing the microprocessor;

generating a third control signal to induce the electrical speaker to emit a second audible instruction of words associated with a first user task, utilizing the microprocessor;

receiving a second input signal indicating initiation of the first user task associated with the second audible instruction of words from either the first switch or the microphone, at the microprocessor;

receiving a third input signal indicating completion of the first user task associated with the second audible instruction of words from either the first switch or the microphone, at the microprocessor;

determining a first time interval for completing the first user task associated with the second audible instruction of words based on the second and third input signals, utilizing the microprocessor;

storing a first time interval value corresponding to the first time interval in the memory device utilizing the microprocessor;

generating a fourth control signal to induce the electrical speaker to emit a third audible instruction of words associated with a second user task, utilizing the microprocessor;

receiving a fourth input signal indicating initiation of the second user task associated with the third audible instruction of words from either the first switch or the microphone, at the microprocessor;

receiving a fifth input signal indicating completion of the second user associated with the third audible instruction of words from either the first switch or the microphone, at the microprocessor;

determining a second time interval for completing the second user task associated with the third audible instruction of words based on the fourth and fifth input signals, utilizing the microprocessor; and storing the second time interval value in the memory device, utilizing the microprocessor.

\* \* \* \* \*